(12) United States Patent
Furukawa

(10) Patent No.: US 6,641,100 B2
(45) Date of Patent: Nov. 4, 2003

(54) TISSUE CASE HOLDER

(75) Inventor: Yukiharu Furukawa, Osaka (JP)

(73) Assignee: Fuji Advertising Co., Ltd., Osaka (JP)

( * ) Notice: Subject to any disclaimer, the term of this patent is extended or adjusted under 35 U.S.C. 154(b) by 0 days.

(21) Appl. No.: 10/207,272

(22) Filed: Jul. 30, 2002

(65) Prior Publication Data

US 2003/0025057 A1 Feb. 6, 2003

(30) Foreign Application Priority Data

Jul. 31, 2001 (JP) ........................................ 2001-230865
Apr. 1, 2002 (JP) ........................................ 2002-098559

(51) Int. Cl.[7] ............................. A47F 5/00; A47G 1/10
(52) U.S. Cl. ............................. 248/309.1; 248/216.1; 248/316.1; 248/905
(58) Field of Search .............................. 248/309.1, 684, 248/310, 316.8, 905, 216.1, 217.2, 217.3, 218.1, 220.22, 224.8, 225.11, 225.21, 316.1; 220/482

(56) References Cited

U.S. PATENT DOCUMENTS

| | | | | |
|---|---|---|---|---|
| 1,170,414 A | * | 2/1916 | Christensen | 248/313 |
| 1,227,165 A | * | 5/1917 | Marin | 248/312.1 |
| 1,306,272 A | * | 6/1919 | Mullen et al. | 248/234 |
| 2,104,612 A | * | 1/1938 | Droll | 24/3.3 |
| 2,155,760 A | * | 4/1939 | Hy | 248/311.2 |
| 2,263,956 A | | 11/1941 | Russell | |
| 2,325,712 A | * | 8/1943 | Shurmur | 248/313 |
| 2,697,572 A | * | 12/1954 | Pfankuch | 248/495 |
| 2,986,366 A | * | 5/1961 | Wesson | 248/285.1 |
| 2,991,036 A | * | 7/1961 | Morgan et al. | 248/206.5 |
| 3,176,943 A | * | 4/1965 | Hughes | 248/490 |
| 3,285,559 A | * | 11/1966 | Simon | 248/313 |
| 3,837,608 A | * | 9/1974 | Simon | 248/313 |
| 5,207,403 A | * | 5/1993 | Penniman | 248/215 |
| 5,246,251 A | * | 9/1993 | Evans | 281/42 |
| 5,494,250 A | | 2/1996 | Chen | |
| 5,996,953 A | * | 12/1999 | Mejia et al. | 248/216.1 |
| 6,543,737 B2 | * | 4/2003 | Decker et al. | 248/316.1 |

FOREIGN PATENT DOCUMENTS

| | | | |
|---|---|---|---|
| CA | 2258381 | * | 7/2000 |
| CH | 657 514 | | 9/1986 |
| JP | 61-183825 | | 11/1986 |
| JP | 10201659 A | * | 8/1998 |
| JP | 2002263031 A | * | 9/2002 |
| JP | 2002369766 A | * | 12/2002 |

* cited by examiner

*Primary Examiner*—Anita King
(74) *Attorney, Agent, or Firm*—Wenderoth, Lind & Ponack, L.L.P.

(57) ABSTRACT

A tissue case holder is provided which is simple in structure and on which a tissue case can be easily and rigidly set. A pair of hooks having tip portions having different lengths from each other are provided on the plate to be mounted on a wall surface or the like. The long tip portion has its back face inclined toward the plate. The short tip portion having its back face inclined away from said plate. By inserting the tip portions of the hooks into holes formed at both ends of a tissue case, and sliding the tissue case toward the proximal end of the short tip portion, due to the inclination of the tip portions, the tissue case is brought into close contact with the plate and is held stably.

5 Claims, 12 Drawing Sheets

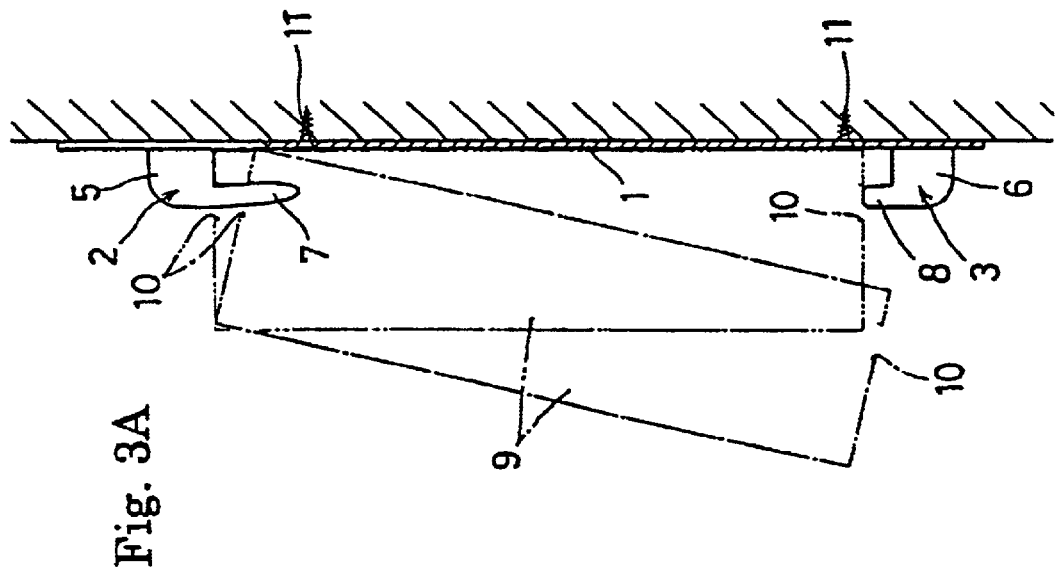
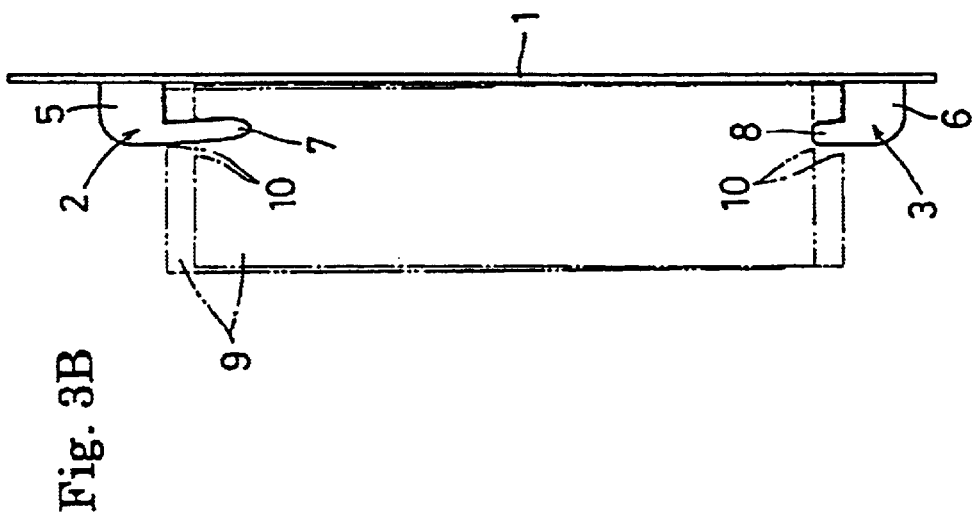

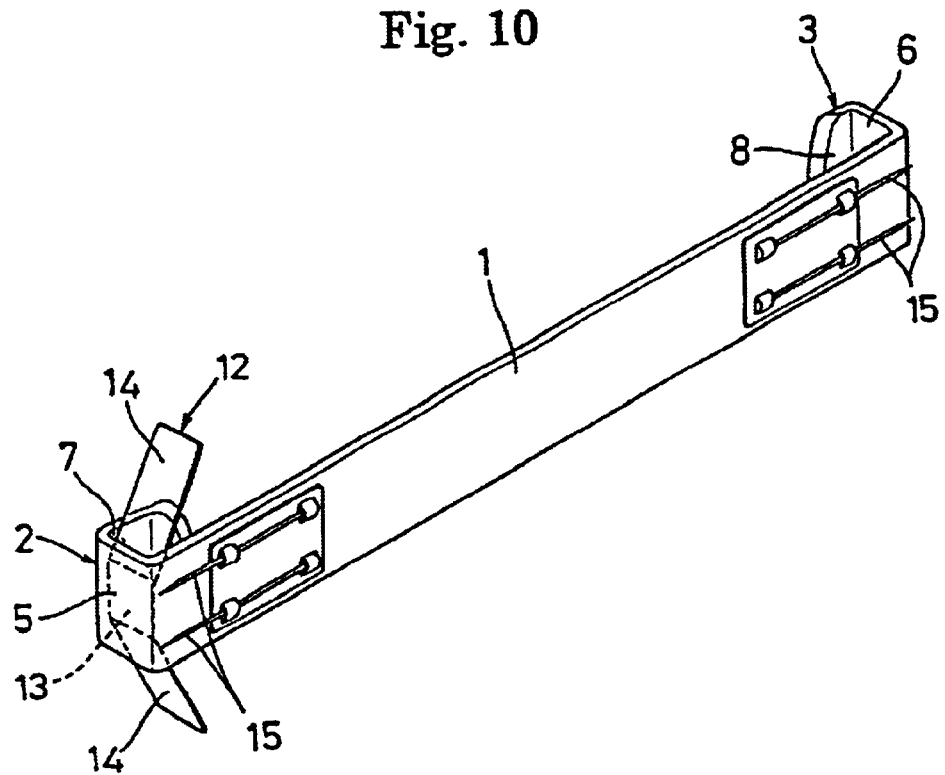

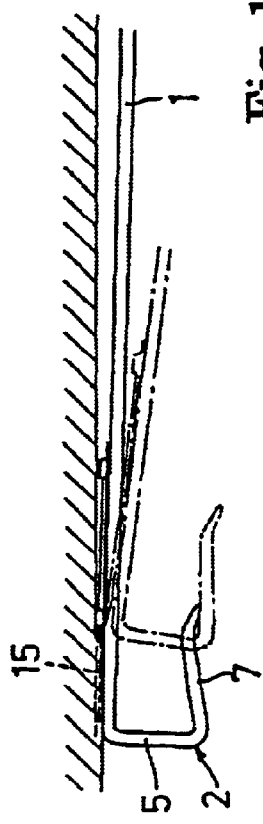
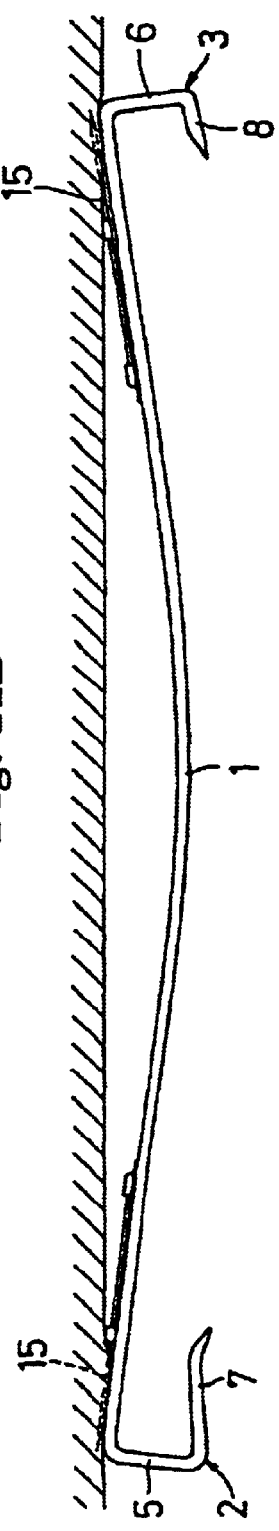
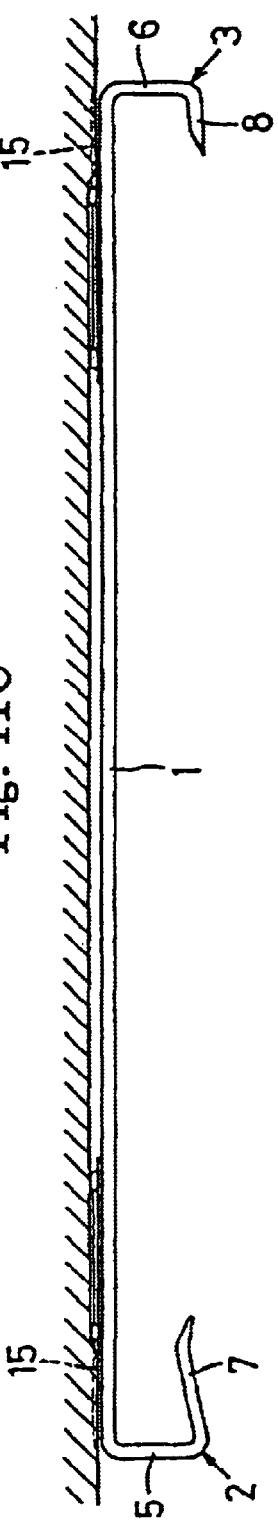
Fig. 11A
Fig. 11B
Fig. 11C

Fig. 12 - PRIOR ART
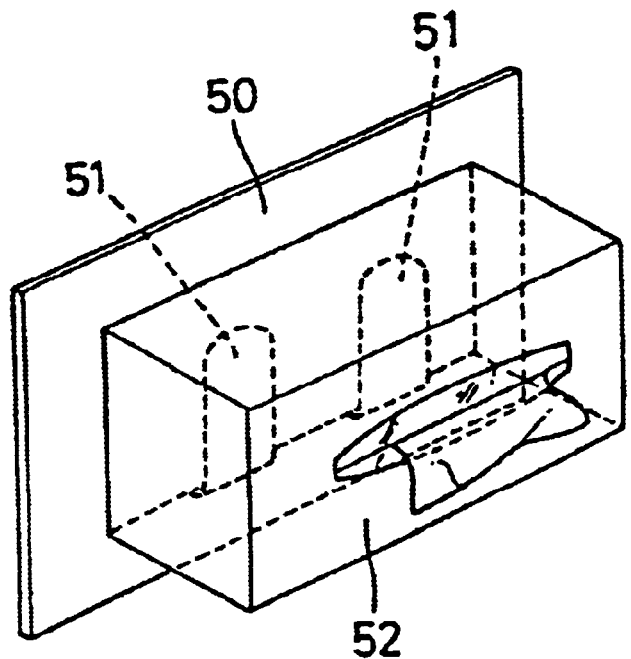
Fig. 13 - PRIOR ART
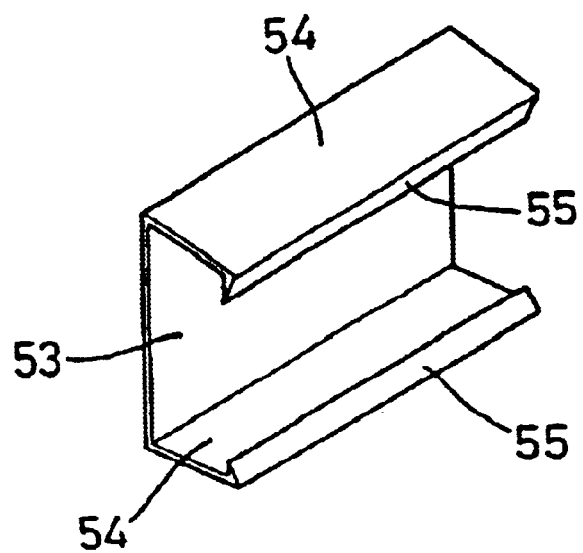

Fig. 14 - PRIOR ART
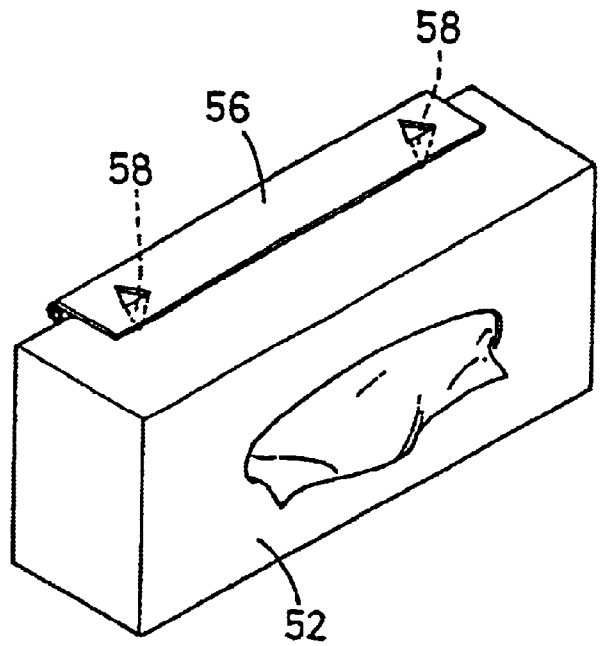
Fig. 15 - PRIOR ART
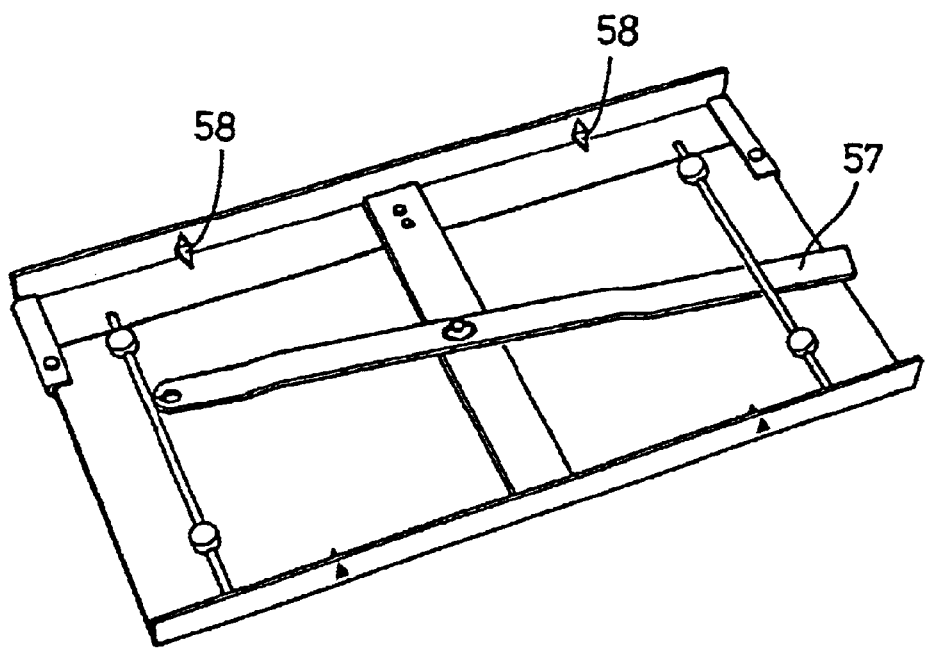

TISSUE CASE HOLDER

BACKGROUND OF THE INVENTION

This invention relates to a tissue case holder for mounting a tissue case to a wall surface or the like.

As a tissue case holder of this kind, JP utility model publication 61-183825 (first prior art), as shown in FIG. 12, one is shown in which an upward hooks 51 are provided on a plate 50 mounted on a wall surface or the like, the tip portions of the hooks 51 are inserted into holes formed in a tissue case 52, and the tissue case is set by sliding it downward.

Also, in JP utility model publication 60-48792 (second prior art), as shown in FIG. 13, one is shown in which holding wings 54 are integrally formed at top and bottom of a back plate 53, and hook tip portions 55 having their surfaces inclined inwardly are formed at their tips, so that a tissue case can be set by pushing it while deforming the holding wings 54.

Also, in JP utility model publications 60-145894 (third prior art) and 4-7482 (fourth prior art), as shown in FIGS. 14 and 15, respectively, ones are shown in which pointed heads 58 are stuck into a tissue case 52 from above and below by pivoting a hinge plate 56 or operating a lever 57 to set the tissue case 52.

But with the tissue case holder of the first prior art, in order to insert the tissue case 52, a certain degree of gap is needed between the tips of the hooks 51 and the plate 50, so that the tissue case 52 may shake.

With the tissue case holder of the second prior art, a large force is required to deflect the holding wings 54, so that it is difficult to set the tissue case. Besides, the direction in which it is mounted on a wall surface or the like is limited.

With the tissue case holders of the third and fourth prior arts, a mechanism for moving the pointed heads 58 up and down is needed, so that the structure tends to be complicated.

An object of this invention is to provide a tissue case holder which can easily and rigidly set a tissue case.

SUMMARY OF THE INVENTION

According to this invention, there is provided a tissue case holder comprising a plate, and a pair of hooks mounted on the plate, the pair of hooks having tip portions bent from base portions so as to face each other, the distance (A) between the base portions of the hooks being greater than the length (L) of a tissue case, one of the tip portions being longer than the other of the tip portions, the distance (B) between the tips of the tip portions being smaller than the length (L) of the tissue case, the long tip portion having its back face inclined toward the plate, the short tip portion having its back face inclined away from the plate, the distance (C) between the back face of the long tip portion and the plate and the distance (D) between the proximal end of the short tip portion and the plate being smaller than the distance (M) between holes at both ends of the tissue case and the bottom of the tissue case.

By inserting an attachment for preventing sliding of the tissue case between the long tip portion and the plate, the tissue case will not fall off even if it is mounted laterally.

By forming the plate and a pair of hooks by bending an elongated plastic plate member, compactness and reduced cost are achieved.

Further, by providing needles on the back of the plate with their pointed tips facing toward both ends, the tissue case holder can be mounted by sticking the needles into a car interior material or the like while deflecting the plate.

BRIEF DESCRIPTION OF THE DRAWINGS

Other features and objects of the present invention will become apparent from the following description made with reference to the accompanying drawings, in which:

FIGS. 3A and 3B are side views showing how a tissue case is set;

FIG. 10 is a perspective view showing how needles for mounting are mounted;

FIGS. 11A–11C are side views showing how the plate is fixed by use of needles; and FIGS. 12–15 are perspective views showing several prior art arrangements.

DETAILED DESCRIPTION OF THE PREFERRED EMBODIMENT

The embodiments of this invention will be described with reference to the attached drawings.

Figure 1:
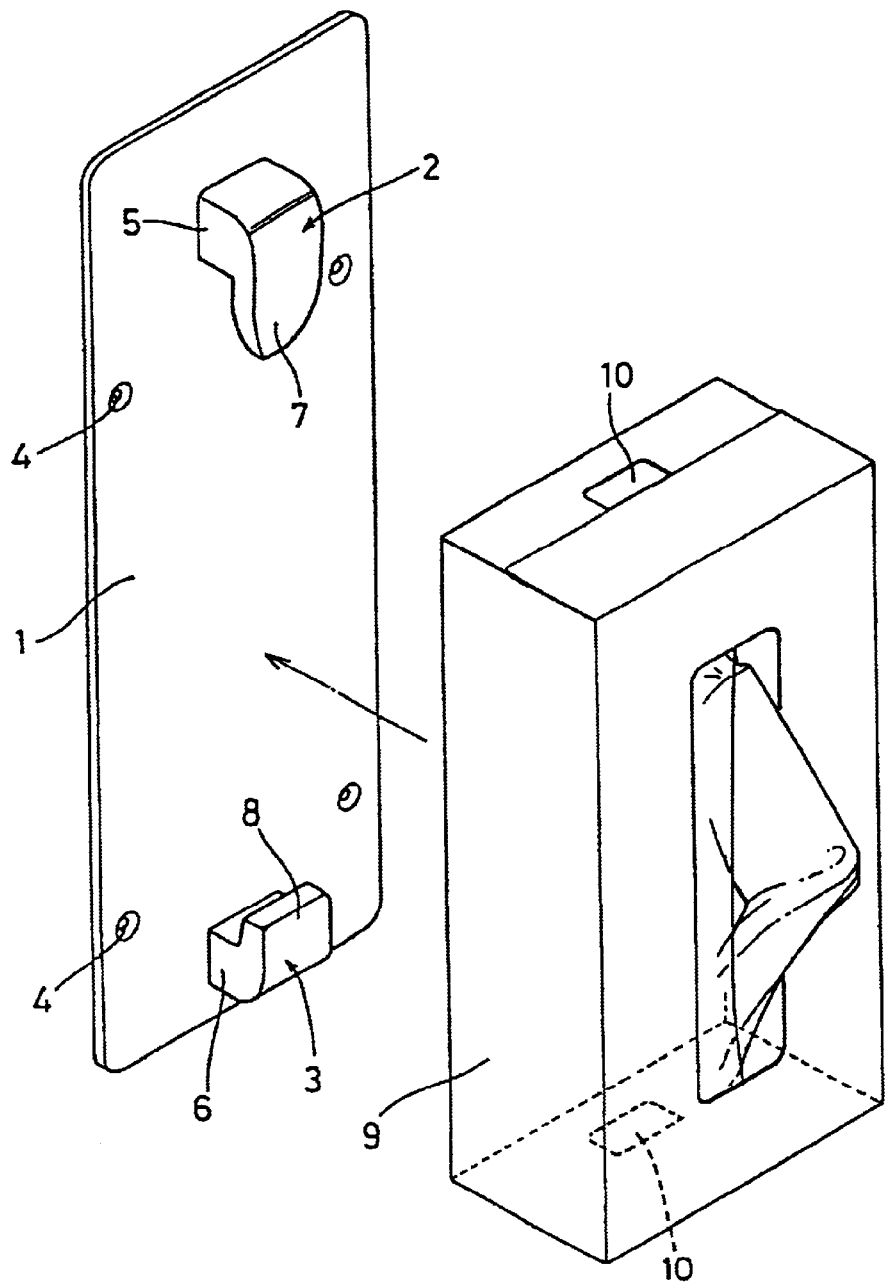
FIG. 1 is a perspective view of a tissue case holder according to one embodiment of this invention.
Figure 2:
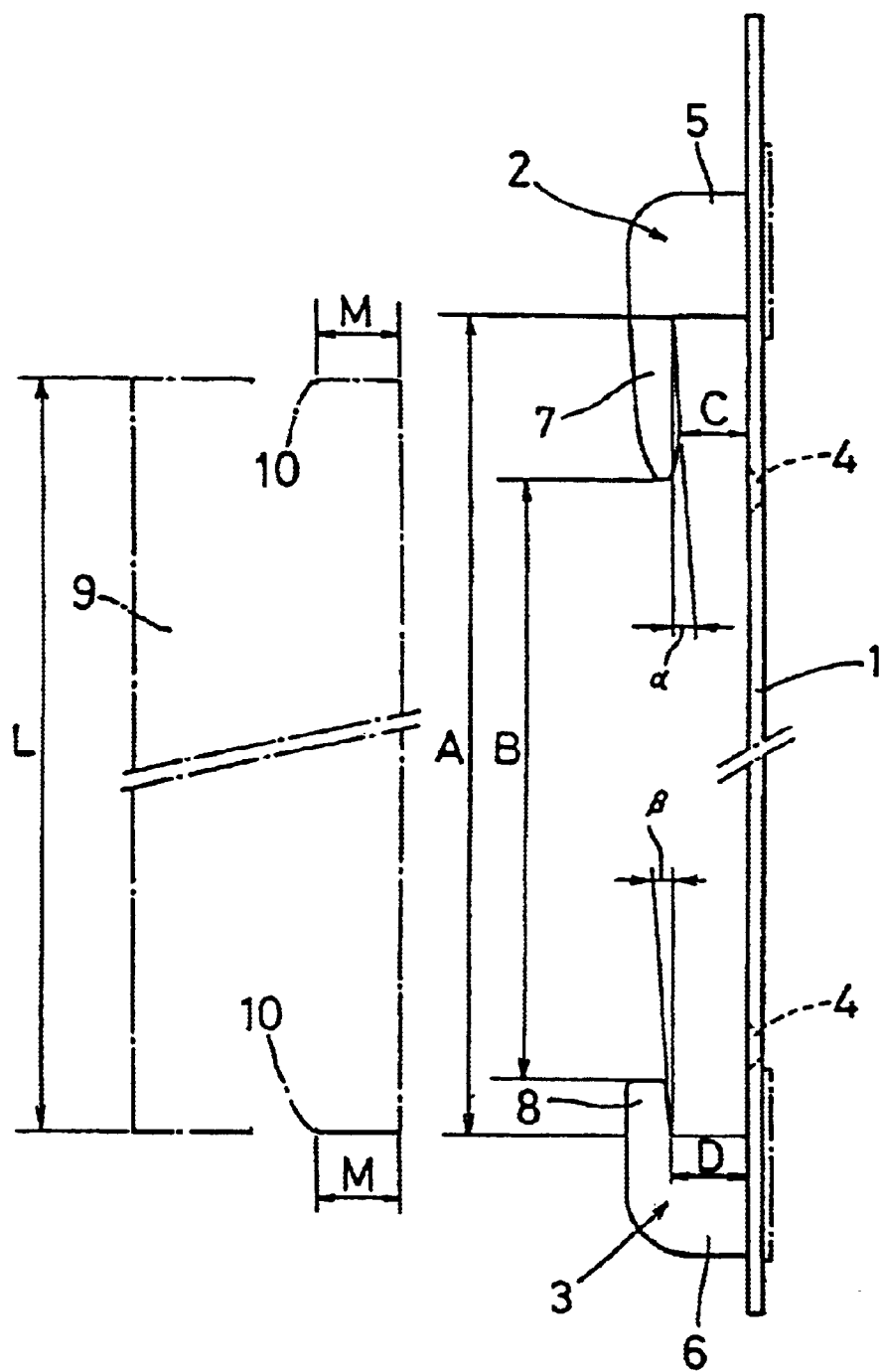
FIG. 2 is a side view of the same.

FIGS. 1 and 2 show the first embodiment. This tissue case holder is provided with a pair of hooks 2 and 3 on an elongate plate 1. Screw holes 4 are formed in the plate 1 to mount it to a wall surface or the like. The shape of the plate 1 is not specifically limited. Advertisements or the like may be printed on the surface of the plate.

The hooks 2, 3 have tip portions 7, 8 bent from their base portions 5, 6, respectively, so as to oppose each other. The distance A (FIG. 2) between the inner edges of the base portions 5 and 6 of the hooks 2, 3 is larger than the length L of a tissue case 9. The tip portion 7 of the hook 2 is longer than the tip portion 8 of the hook 3. The distance B between the tips of the tip portions 7 and 8 is smaller than the length L of the tissue case 9.

The back face of the tip portion 7 is inclined by an angle α toward the plate relative to the vertical line, that is, the surface of the plate 1. The back face of the tip portion 8 is inclined away from the plate 1 by an angle β relative to the vertical line, that is, the surface of the plate 1.

The distance C between the rear face of the tip portion 7 and the plate 1, and the distance D between the base of the tip portion 8 and the plate 1 are slightly smaller than the distance M between holes 10 formed at both ends of the tissue case and its bottom.

In using such a tissue case holder, the plate 1 is fixed to a wall surface or the like beforehand using screws 11 as shown in FIG. 3A or using double-sided adhesive tape stuck on the back of the plate 1. On a metallic surface, it may be fixed by magnets stuck on the back of the plate 1.

On the other hand, as shown in FIG. 1, the holes 10 are formed in both ends of the tissue case. Such holes 10 for collapsing after use are formed in most tissue cases now on the market at substantially the same positions.

As shown in FIG. 3A, the tip portion 7 of the hook 2 is inserted into the upper hole 10 while inclining the tissue case 9. Next, the tissue case is returned to its vertical position, and the tip portion 8 of the hook 3 is inserted into the bottom hole 10.

As shown in FIG. 3B, when the tissue case 9 is slid downward, due to inclination of the back faces of the tip portions 7 and 8, the tissue case will be pulled toward the plate 1 and brought into close contact with the plate 1.

Thus, with this tissue case holder, using the holes 10 for collapsing at both ends of the tissue case 9, the latter can be set easily. In this state, the tissue case 9 will not shake.

Even if the height or length of the tissue case 9 slightly varies, provided the distance M between the holes 10 and the bottom of the case is substantially constant, the tissue case 9 can be set without any problem and there will be no trouble in use.

Figure 4:
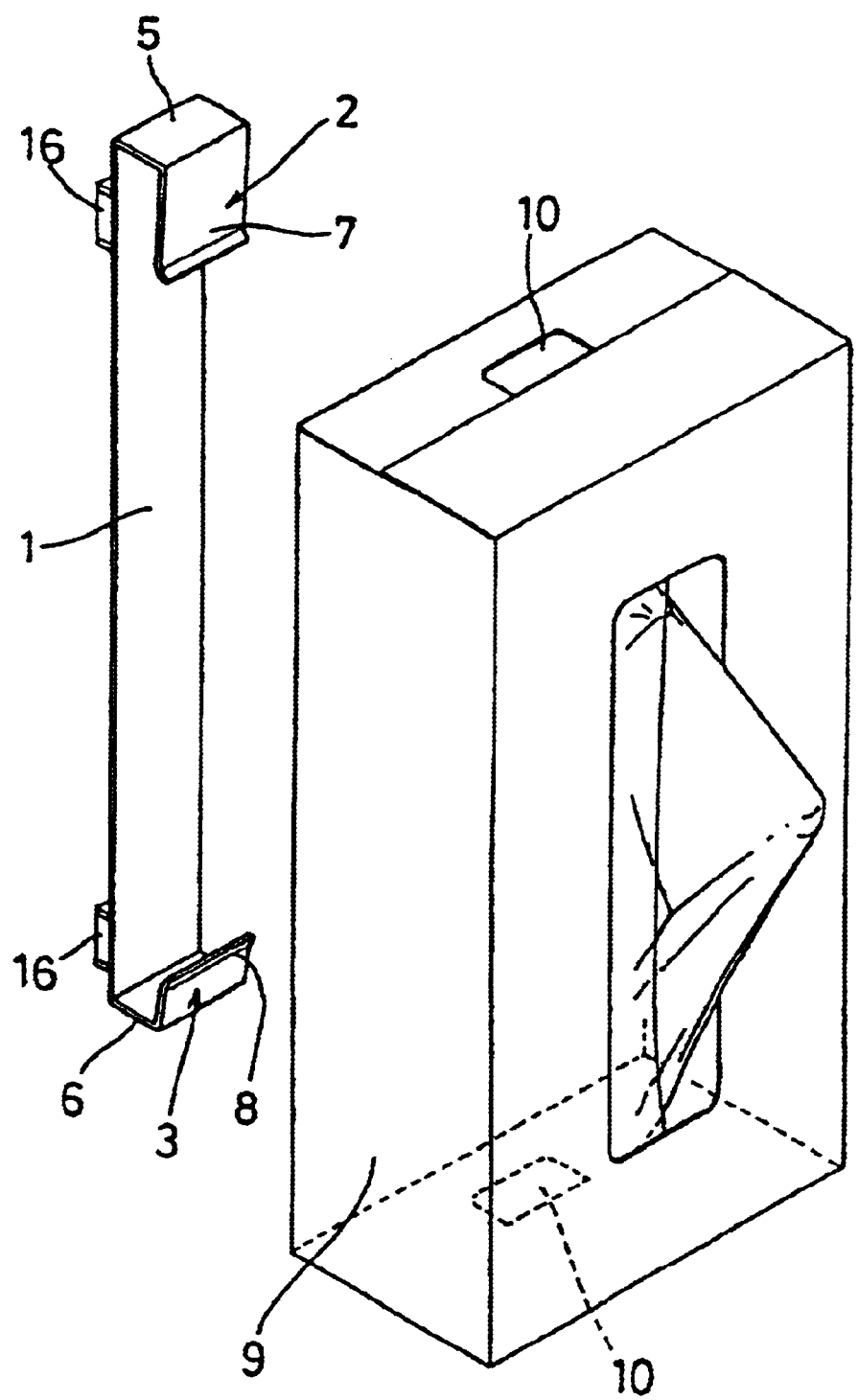
FIG. 4 is a perspective view of a tissue case holder according to another embodiment of this invention.

Next, another embodiment of this invention is shown in FIG. 4. With this tissue case holder, the plate 1 and the hooks 2 and 3 are formed by bending an elongated plastic plate member. This embodiment improves compactness and reduces cost. In this embodiment, magnets 16 for fixing to a metallic surface are stuck on the back of the plate 1.

If such a tissue case holder is mounted laterally to a wall surface or the like, the tissue case 9 may slide toward the proximal end of the long tip portion 7, so that the short tip portion 8 may come out of the hole 10 and the tissue case 9 may fall off.

Figure 5:
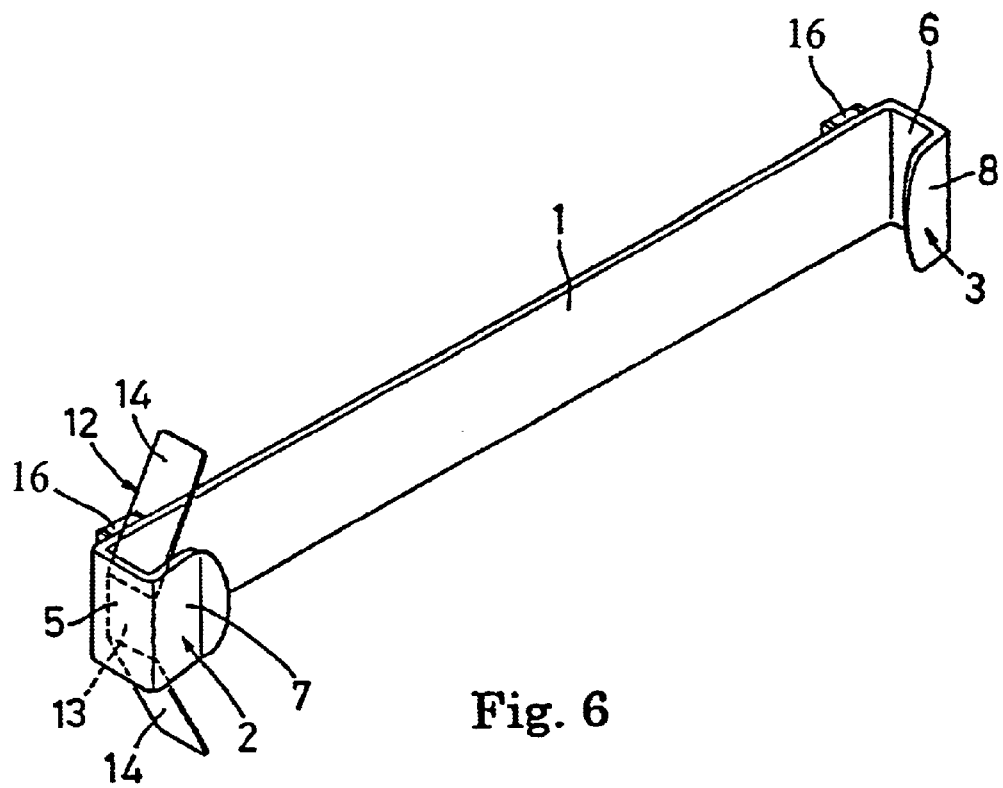
FIG. 5 is a perspective view showing how the attachment is set.

In order to prevent such a phenomenon, as shown in FIG. 5, an attachment 12 may be inserted between the tip portion 7 of the hook 2 and the plate 1.

The attachment 12 is formed of a plastic plate member having elasticity and is integrally formed with obliquely outwardly extending wings 14 on both sides of an intermediate portion 13 by bending both ends of the plate member toward the same side by plastic deformation.

Figure 6:
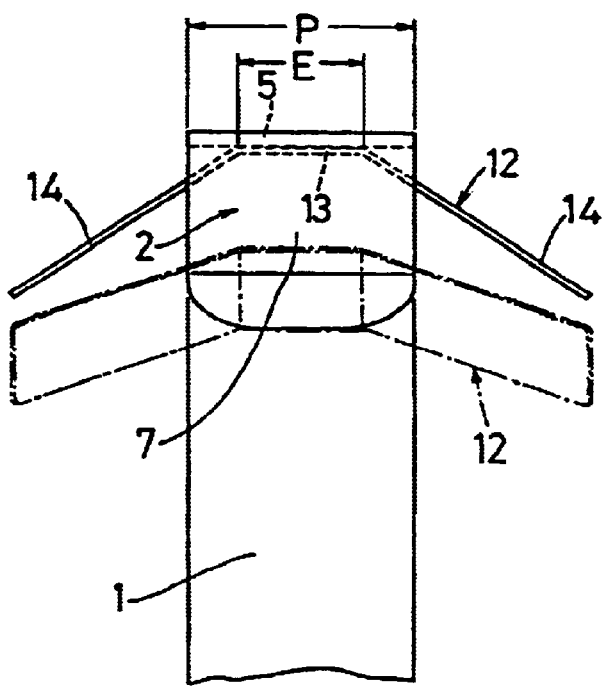
FIG. 6 is an enlarged front view showing how the attachment is set.
Figure 7:
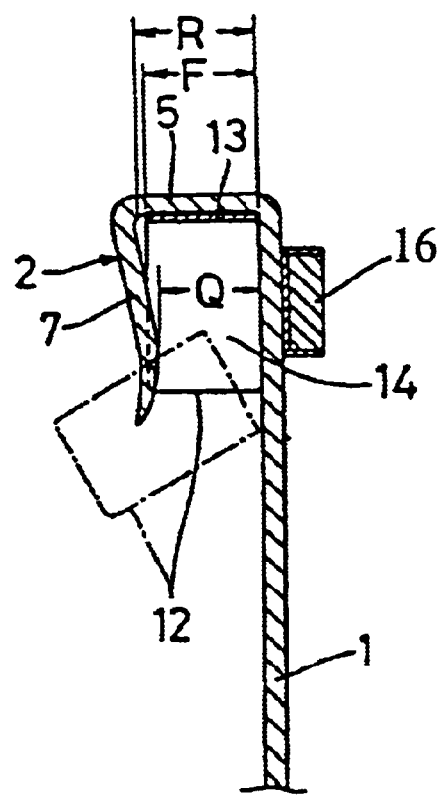
FIG. 7 is a partial sectional side view of the plate.

As shown in FIGS. 6 and 7, the length E of the intermediate portion 13 of the attachment 12 is smaller than the width P of the plate 1. The width F of the attachment 12 is greater than the minimum distance Q between the tip portion 7 and the plate 1 and is slightly smaller than the distance R between the proximal end of the tip portion 7 and the plate 1.

In order to insert such an attachment 12 between the tip portion 7 and the plate 1, as shown by chain lines in FIG. 7, it is passed between the tip of the tip portion 7 and the plate 1 while inclining the attachment 12, and after its intermediate portion 13 has been inserted toward the proximal end of the tip portion 7, the attachment 12 is returned from its inclined position.

Thus, the attachment 12 is prevented from coming out of the space between the tip portion 7 and the plate 1.

Figure 8:
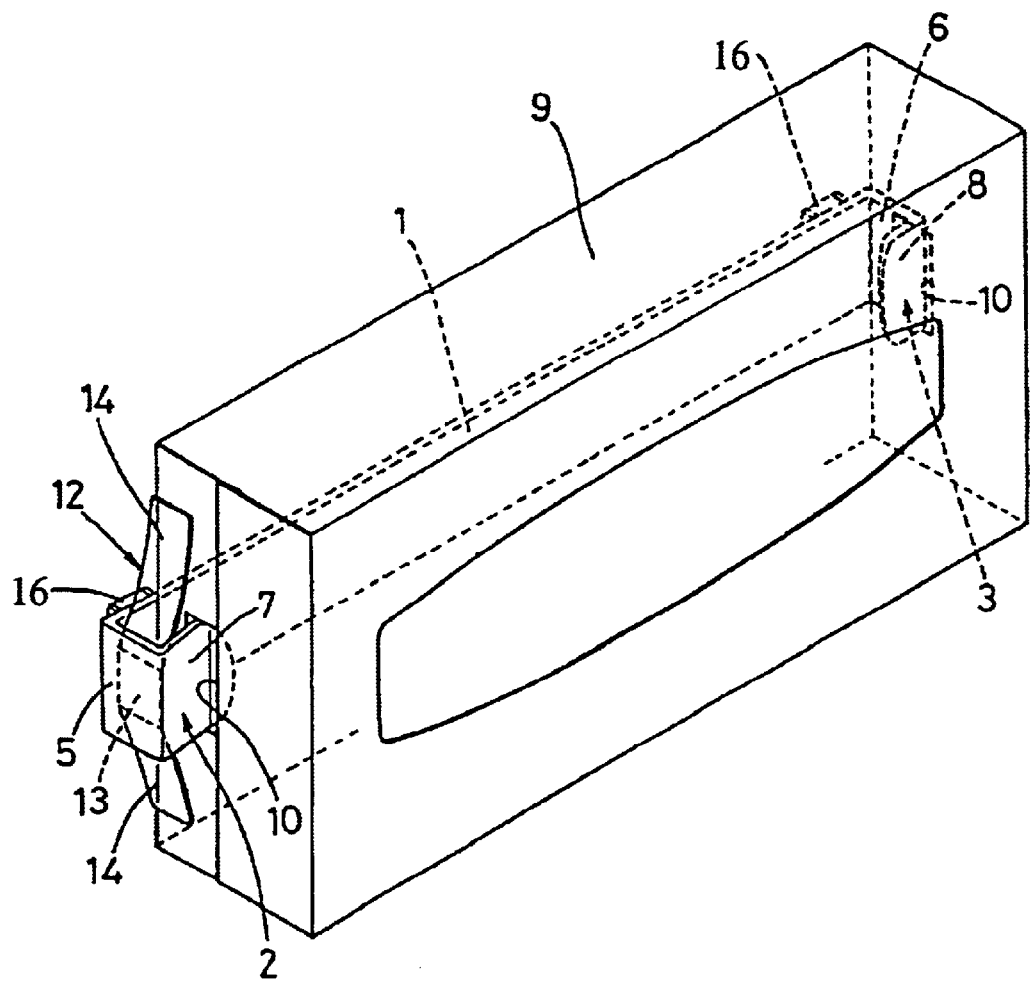
FIG. 8 is a perspective view showing how a tissue case is set.

As shown in FIG. 8, when the tissue case 9 is set, an end face of the tissue case 9 is elastically pressed by the wings 14 of the attachment 12. This prevents the tissue case 9 from sliding and falling off the plate 1.

Thus, by using the attachment 12, on the tissue case holder according to this invention, the tissue case 9 can be mounted either in an upright or lateral position.

Figure 9:
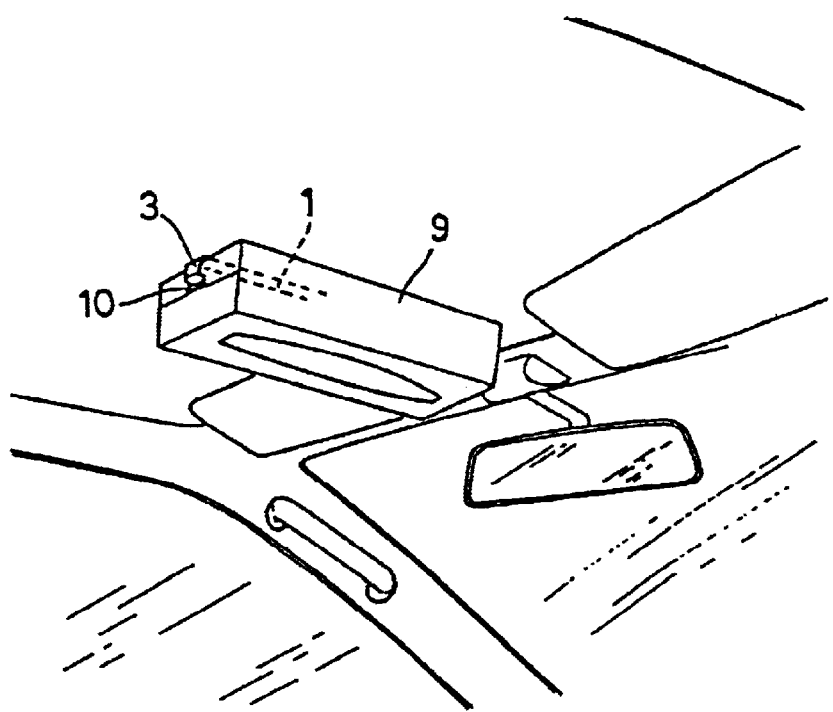
FIG. 9 is a perspective view showing how a tissue case is mounted in a car.

Besides, as shown in FIG. 9, the tissue case holder formed of a plastic plate member can be mounted in an automobile to a portion where a cloth interior material is stretched, such as the inner surface of the roof or a hood.

In this case, as shown in FIG. 10, needles 15 may be provided on the back of the plate 1 so as to be slightly afloat from the plate 1 with their pointed tips facing toward both ends. If two such needles 15 are provided at both ends, stability during mounting improves. If this tissue case holder is mounted laterally e.g. in a car, the attachment 12 is fitted in the hook 2.

In mounting the tissue case holder, as shown in FIG. 11A, the needles 15 at one end are stuck into the interior material or the like. Next, as shown in FIG. 11B, the other needles 15 are stuck into the interior material or the like while deflecting the plate 1. When the plate 1 is restored by elastic force, as shown in FIG. 11C, the needles at both ends will go deeply and prevent the plate 1 from coming out of the interior material or the like.

Thus, if the tissue case holder is mounted to the front portion of the ceiling in a car and a tissue case is set on it, a person sitting on the driver's seat or assistant driver's seat can easily take out tissue paper. Thus, it is possible to prevent accidents due to inattentive driving.

Since the needles 15 are stuck into the texture of fibers of the interior material, no conspicuous scratches or stains will remain when the tissue case holder is dismounted.

As described above, since the tissue case holder according to this invention has a simple structure with a pair of hooks provided on its plate, it can be manufactured at a low cost. By inserting the hooks into the holes for collapsing formed at both ends of a tissue case one after the other and sliding the tissue case, the tissue case can be set easily and rigidly.

Also, by inserting the attachment for preventing sliding of the tissue case between the tip portion of a hook and the plate, even when a tissue case is mounted laterally on a wall surface, it will not fall off.

Also, if the plate and the pair of hooks are formed by bending an elongated plastic plate member, compactness and low cost can be achieved.

Further, if needles are provided slightly afloat from the back of the plate with the pointed tips facing toward both ends, it is possible to mount it in a position where tissue can be taken out easily by sticking the needles into an interior material of a car. Thus, it is possible to prevent accidents due to inattentive driving.

What is claimed is:

1. A tissue case holder comprising a plate, and a pair of hooks mounted on said plate, said pair of hooks having tip portions bent from base portions so as to face each other, the distance (A) between said base portions of said hooks being greater than the length (L) of a tissue case, one of said tip portions being longer than the other of said tip portions, the distance (B) between the tips of said tip portions being smaller than the length (L) of the tissue case, the long tip portion having its back face inclined toward said plate, the short tip portion having its back face inclined away from said plate, the distance (C) between the back face of the long tip portion and said plate and the distance (D) between the proximal end of the short tip portion and said plate being smaller than the distance (M) between holes at both ends of the tissue case and the bottom of the tissue case.

2. A tissue case holder as claimed in claim 1 further comprising an attachment for preventing sliding of the tissue case, said attachment being detachably inserted between the long tip portion and said plate.

3. A tissue case holder as claimed in claim 1 wherein said plate and said pair of hooks are formed by bending an elongated plastic plate member.

4. A tissue case holder as claimed in claim 3 wherein needles are provided on the back of said plate with their pointed tips directed toward both ends of said plate.

5. A tissue care holder as claimed in claim 2 wherein said plate and said pair of hooks are formed by bending an elongated plastic plate member.

* * * * *